United States Patent
Álvarez De Diego et al.

(10) Patent No.: US 12,269,771 B2
(45) Date of Patent: Apr. 8, 2025

(54) ARTIFICIAL AGGLOMERATE STONE ARTICLE COMPRISING SYNTHETIC SILICATE GRANULES

(71) Applicant: COSENTINO RESEARCH & DEVELOPMENT, S.L., Almería (ES)

(72) Inventors: Javier Álvarez De Diego, Almería (ES); José Manuel Benito López, Almería (ES)

(73) Assignee: COSENTINO RESEARCH & DEVELOPMENT, S.L. (ES)

( * ) Notice: Subject to any disclaimer, the term of this patent is extended or adjusted under 35 U.S.C. 154(b) by 647 days.

(21) Appl. No.: 17/619,358

(22) PCT Filed: Jul. 30, 2020

(86) PCT No.: PCT/EP2020/071474
§ 371 (c)(1),
(2) Date: Dec. 15, 2021

(87) PCT Pub. No.: WO2021/018996
PCT Pub. Date: Feb. 4, 2021

(65) Prior Publication Data
US 2022/0250980 A1    Aug. 11, 2022

(30) Foreign Application Priority Data
Jul. 31, 2019 (EP) .................... 19382662

(51) Int. Cl.
*C04B 18/02* (2006.01)
*C04B 26/06* (2006.01)
*C04B 111/54* (2006.01)

(52) U.S. Cl.
CPC ............ *C04B 18/022* (2013.01); *C04B 26/06* (2013.01); *C04B 18/023* (2013.01); *C04B 2111/542* (2013.01); *C04B 2201/20* (2013.01)

(58) Field of Classification Search
CPC . C04B 18/022; C04B 26/06; C04B 2111/542; C04B 2201/20; C04B 18/023; C04B 18/02; C04B 2111/54; C04B 2111/545; C04B 2201/00; C04B 2235/00; C04B 14/041; C04B 14/106; C04B 14/26; C04B 14/28; C04B 14/22; C04B 40/0067; C04B 40/0071
See application file for complete search history.

(56) References Cited

U.S. PATENT DOCUMENTS

| | | | |
|---|---|---|---|
| 4,204,820 A | | 5/1980 | Toncelli et al. |
| 5,264,168 A | * | 11/1993 | Toncelli .............. C04B 35/6316 264/102 |
| 5,364,672 A | | 11/1994 | Schultze-Kraft |
| 2018/0354841 A1 | * | 12/2018 | Kunisa .................... C03C 1/026 |
| 2020/0299188 A1 | * | 9/2020 | Chen ....................... C04B 14/06 |

FOREIGN PATENT DOCUMENTS

| | | | |
|---|---|---|---|
| CN | 109734356 A * | 5/2019 | ............. C04B 14/06 |
| EP | 1638759 A1 | 3/2006 | |
| EP | 2011632 A2 | 1/2009 | |
| EP | 2409959 A1 | 1/2012 | |
| JP | 2011105555 A | 6/2011 | |
| WO | 2018189663 A1 | 10/2018 | |

OTHER PUBLICATIONS

Bastin, "Economic Geology of the Feldspar Deposits of the United States", Department of the Interior, United States Geological Survey, Bulletin 420, 1910. (Year: 1910).*
Search report from International Application No. PCT/EP2020/071474, mailed Oct. 21, 2020.
Sarabér, Angelo, et al., "Artificial lightweight aggregates as utlization for future ashes—A case study." Waste Management (2012) (Available online Oct. 2, 2011), vol. 32, No. 1, pp. 144-152.

* cited by examiner

*Primary Examiner* — Anthony J Green
*Assistant Examiner* — Marites A Guino-O Uzzle
(74) *Attorney, Agent, or Firm* — Lerner David LLP

(57) ABSTRACT

The invention relates synthetic silicate granules comprising a mixture of $SiO_2$, $Al_2O_3$, $Na_2O$ and $CaO$, which can be obtained by sintering; to their use in manufacturing an agglomerate stone material and to the agglomerate stone material resulting thereof.

19 Claims, No Drawings

ARTIFICIAL AGGLOMERATE STONE ARTICLE COMPRISING SYNTHETIC SILICATE GRANULES

CROSS-REFERENCE TO RELATED APPLICATIONS

The present application is a national phase entry under 35 U.S.C. § 371 of International Application No. PCT/EP2020/071474 filed on Jul. 30, 2020, which claims priority from European Application No. 19382662.5 filed on Jul. 31, 2019, all of which are incorporated herein by reference.

FIELD OF THE INVENTION

The invention is related to materials for construction, decoration and architecture, made of artificial agglomerate stone, as well as to their manufacture and fabrication. Particularly, the invention falls within the technological field of artificial stone articles composed of inorganic fillers selected from stone, stone-like or ceramic materials, and a hardened organic resin, manufactured by a process which includes vacuum vibrocompaction and hardening of unhardened agglomerate mixtures.

BACKGROUND OF THE INVENTION

Artificial agglomerate stone articles which simulate natural stones, also known as engineered stone articles, are common in the construction, decoration, architecture and design sectors. The processes for their manufacture at industrial scale are well established nowadays.

One of most popular artificial stone materials, highly appreciated by their aesthetic, hardness and resistance to staining and wear, are the so-called quartz agglomerate surfaces. They are extensively used for countertops, claddings, floorings, sinks and shower trays, to name a few applications. They are generally called artificial stones, and their applications coincide with the applications of stones such as marble or granite. They can be made simulating the colors and patterns in natural stone, or they might also have a totally artificial appearance, e.g. with bright red or fuchsia colors. The basis of their composition and the technology currently used for their manufacture dates back from the late 1970s, as developed by the Italian company Breton SpA, and which is nowadays commercially known in the sector under the name Bretonstone®. The general concepts hereof are described, for example, in the patent publication U.S. Pat. No. 4,204,820. In this production process, quartz and/or cristobalite stone granulate, having varied particle sizes, are firstly mixed with a hardenable binder, normally a liquid organic resin. The resulting mixture is homogenized and distributed on a temporary mold, wherein it is then compacted by vibrocompaction under vacuum and subsequently hardened.

A different sort of artificial agglomerate materials is the generally known 'solid surface'. With this rather indefinite term, the industry refers to construction materials of hardened (mostly acrylic) organic resin with ATH (alumina trihydrate, bauxite) as predominant filler. Such products are produced by cast-molding the liquid acrylic resin and ATH flowable mixture, optionally together with vibration to remove air bubbles, and then heat hardening the mixture. Due to the requirement of enough flowability to facilitate casting and air removal, the amount of liquid resin is normally not lower than 20 wt. % of the uncured mixture. In comparison with quartz surfaces, solid surfaces suffer from lower hardness and wear resistance, and are inferior when trying to mimic the appearance of natural stones (the user associates them with plastic composites, and not with natural stones).

Other combinations of stone granulate filler and binder have been proposed, with varied commercial success. Thus, for example, marble and granite have been tried as granulates for agglomerates together with organic resins, but they resulted in materials with significantly lower performance than quartz surfaces for their use as construction materials and highly limited possibilities regarding their appearance. Myriad of other mineral and non-mineral granulate fillers have been described, mostly in the patent literature, such as recycled glass, glass frits, glass beads, feldspars, porphyry, amorphous silica, ceramics, dolomite, basalt, carbonates, metal silicon, fly-ash, shells, corundum, silicon carbide, among many others. On the other hand, inorganic binders, such as hydraulic cement, have been used instead of organic resins in commercial agglomerate artificial stone for building applications.

Quartz and cristobalite are two of the most common crystalline forms of silica ($SiO_2$) in nature, cristobalite being significantly less frequent. Quartz is present in all types of rocks, igneous, metamorphic and sedimentary. Cristobalite is a high temperature crystalline polymorph of silica, formed in nature as result of volcanic activity, or artificially, by the catalyzed conversion of quartz at high temperature in a rotary kiln. Both quartz and cristobalite have high melting points, high hardness, they are translucent or transparent, and relatively inert to chemical attacks. These properties, together with their abundance and availability, have made them extremely useful as granulate filler for quartz surfaces. Cristobalite is furthermore used in those materials due to its outstanding whiteness. The amount of quartz/cristobalite in those materials normally range from 50-95 wt. %, the rest being other inorganic fillers and the hardened organic resin.

As mentioned above, quartz and cristobalite have several characteristics that make them ideal fillers for the application in the manufacture of durable construction/decoration surfaces, such as high abundance and availability, hardness, translucency, whiteness and chemical inertness. However, they have at least one very serious drawback. The fine fraction of respirable crystalline silica dust generated during the manufacture of the artificial agglomerate stone containing quartz or cristobalite, or when this agglomerate material is mechanically processed, possess a serious occupational health risk for workers or fabricators. Prolonged or repeated inhalation of the small particle size fraction of crystalline silica dust has been associated with pneumoconiosis (silicosis), lung cancer and other serious diseases. To avoid this hazard, workers potentially exposed to high levels of the respirable fraction of crystalline silica dust are required to wear personal protection equipment (e.g. respirators with particle filter), to work under ventilation for efficient air renewal and to use measures which fight the source of the dust (e.g. processing tools with water supply or dust extraction).

To cope with this shortcoming from the raw material side, natural materials such as feldspar could be proposed as substitute of quartz and/or cristobalite in quartz surfaces. Indeed, feldspar has been described as suitable filler in this type of products, for example in EP2011632A2 examples 1 or 2. However, the problem with natural raw materials is the variability in their characteristics, such as color, composition, transparency, etc. Feldspar and other natural minerals are furthermore very frequently accompanied by substantive amounts of quartz.

Ceramics have been sometimes mentioned as possible fillers in artificial stone agglomerate, as in EP 2409959 A1, although without giving any particulars of the type of ceramic material or their advantages. Glass particles and glass beads have often been described as suitable inorganic particulate fillers, for example in EP 1638759 A1. Although glass particles have some characteristics interesting for their use as fillers, such as their transparency or the absence of crystalline silica in their structure, their comparatively excessive production cost has limited their use. The replacement of new glass by glass cullet (glass particles recovered from industrial or urban glass waste), as described for example in U.S. Pat. No. 5,364,672 A, has not been a satisfactory more economical alternative, due to its variability and the nearly unavoidable presence of cumbersome contaminants in this recycled material.

It has been suggested in the past the use of glass frits as inorganic granulate filler, for example in WO2018189663A1. Although this reference does not sufficiently describe how the frits can be produced, these materials are normally made from quartz as main raw materials (as other glasses), which needs to be fused totally to reduce the crystalline silica content. This exhaustive amorphization requires high temperatures around 1,400° C.-1,700° C. and long furnace residence times (several hours), which goes together with high energetic costs. Apart from this difficult manufacture and excessive cost, from the disclosure in WO2018189663A1 it is not clear whether the properties and the visual appearance of the frit granulate comes close to the properties and appearance of quartz or cristobalite granules, and whether the potentially obtainable agglomerate products, would comply with the high aesthetic and mechanical demands for this type of agglomerate material. Furthermore, in the production of frit materials, the molten glass stream of sufficiently low viscosity is rapidly quenched with cold water to maintain the vitreous molecular structure (to avoid recrystallization) and ground. Before they can be used, the frit granules need to be dried at sufficiently high temperature to remove most of the water, which requires additional energy input, and finally grinded to the desired particle size.

From this background it is obvious that there is still a need for an alternative synthetic material obtainable in granule form at affordable cost, for its use as filler in artificial agglomerate stone articles which has a combination of the following advantages:

It can be produced from readily available raw materials and at a competitive cost;
It does not generate troubling levels of respirable crystalline silica during handling or processing,
It does not limit the chromatic effects and color richness of the currently available quartz agglomerate articles;
It can be used with minor modifications in the currently available industrial manufacturing processes for quartz agglomerate articles; and
It does not impair the performance of the agglomerate articles when compared to current quartz agglomerate articles, in terms of scratch resistance, durability, stain- and chemical-resistance.

SUMMARY OF THE INVENTION

The invention is based on the finding by the inventors, after extensive research and experimentation, that certain types of synthetic silicate granules, which can be defined by their chemical composition of specific metal oxides, can be used as fillers of excellent whiteness in the manufacture of artificial agglomerate stone articles or materials replacing quartz and/or cristobalite granules. These synthetic silicate granules do not suffer from the shortcomings observed for the fillers alternative to quartz and/or cristobalite described previously.

Thus, in a first aspect, the invention is concerned with synthetic silicate granules comprising:
57.00-66.50 wt. % of $SiO_2$,
17.00-23.00 wt. % of $Al_2O_3$,
7.90-10.50 wt. % of $Na_2O$, and
2.50-12.80 wt. % of CaO,
based on the weight of the synthetic silicate granules.

In a second aspect, the invention is concerned with the use of synthetic silicate granules as defined in the first aspect, for the manufacture of an artificial agglomerate stone material.

A third aspect of the invention refers to an artificial agglomerate stone material comprising inorganic fillers and a hardened binder, wherein the inorganic fillers comprise the synthetic silicate granules are as defined in the first aspect.

In a fourth aspect, the invention is concerned with the use of synthetic silicate granules as defined in the first aspect in an artificial agglomerate stone material, to reduce the emissions of crystalline silica when the material is manufactured and/or mechanized (i.e. cut, gauged, polished, etc.).

In a fifth aspect, the invention is directed to a process for preparing an artificial agglomerate stone material as defined in the third aspect, comprising:
a) mixing a hardenable binder and the inorganic fillers comprising the synthetic silicate granules as defined in the first aspect,
b) vacuum vibrocompacting the mixture obtained in a), and
c) hardening the compacted mixture obtained in b).

In a sixth aspect, the invention is directed to a process of the fifth aspect, wherein the synthetic silicate granules are obtained by sintering a mixture of feldspar and a modifier, the modifier being preferably selected from kaolin, calcite, dolomite, and mixtures thereof, and wherein the weight ratio of feldspar to modifier is preferably from 95:5 to 80:20.

DETAILED DESCRIPTION OF THE INVENTION

The synthetic silicate granules according to the different aspects of the invention have the characteristics of having an excellent whiteness, some level of transparency, and when mixed with resin, they do not present an important color deviation from the color of high-quality quartz and/or cristobalite. The granules furthermore present good homogeneity, high hardness, good resistance to chemical attack, low porosity, low level of defects and low content of crystalline silica. Furthermore, since the sintering temperatures are lower than the typical glass fusion temperatures, and since no water drying step is required, the synthetic silicate granules can be produced at a lower energetic cost than the glass or frit alternatives.

In the present application, the term "granules" usually refers to individual units (particles). Thus, the term encompasses units ranging from infinitesimal powder particulates with sizes on the micrometer scale up to comparatively large pellets of material with sizes on the millimeter scale. This term encompasses particulate products of a variety of shapes and sizes, including grain particles, fines, powders, or combinations of these.

Also, in the present application the term "synthetic" is used to indicate that the material is obtained by man-made transformation of raw materials, e.g. by thermal or chemical processes, into a mass of a different substance, normally not present as such in nature, and which cannot be separated back to the starting raw materials. In particular, the synthetic silicate granules of the present invention are preferably obtained by thermal treatment of selected raw materials, and more preferably, the synthetic silicate granules are ceramic granules.

The particle size, also called particle diameter, of the granules can be measured by known screening separation using sieves of different mesh size. The term "particle size" as used herein, means the range in which the diameter of the individual particles in the synthetic silicate granules falls. It can be measured by particle retention or passage on calibrated sieves that have measured mesh size openings, where a particle will either pass through (and therefore be smaller than) or be retained by (and therefore larger than) a certain sieve whose size openings are measured and known. Particle sizes are defined to be within a certain size range determined by a particle's ability to pass through one sieve with larger mesh openings or 'holes" and not pass through a second sieve with smaller mesh openings. For synthetic silicate granules with a particle size <200 micrometers, the particle size distribution of a granule sample can be measured by laser diffraction with a commercial equipment (e.g. Malvern Panalytical Mastersizer 3000 provided with a Hydro cell). For the measurement, the granule sample might be dispersed in demineralized water assisted by an ultrasound probe. The laser diffractomer provides particle distribution curves (volume of particles vs. particle size) and the D10, D50 and D90 statistical values of the particle population of the sample (particle size values where 10%, 50% or 90% of the sample particle population lies below this value, respectively).

The composition of the granules might be obtained by X-ray fluorescence (XRF), a technique well-established in the mineral technological field. The composition of the granules indicated herein corresponds preferably to the average, calculated from at least 3 repetitions of the measurement, of the composition of samples containing a mass of granules (e.g. 1 gram of granules).

The skilled person readily understands that, when a composition or material is defined by the weight percentage values of the components it comprises, these values can never sum up to a value which is greater than 100%. The amount of all components that said material or composition comprises adds up to 100% of the weight of the composition or material.

The synthetic silicate granules of the different aspects of the invention are characterized by a composition which comprises oxides according to the following ranges in weight percent, based on the weight of the synthetic silicate granules:

|   | Range (wt. %) |
|---|---|
| $SiO_2$ | 57.00-66.50 |
| $Al_2O_3$ | 17.00-23.00 |
| $Na_2O$ | 7.90-10.50 |
| CaO | 2.50-12.80 |

It needs to be understood that the synthetic silicate granules have a combination of the composition ranges in the preceding table.

According to an embodiment, the synthetic silicate granules are characterized by a composition which comprises oxides according to the following ranges in weight percent, based on the weight of the synthetic silicate granules:

|   | Range (wt. %) |
|---|---|
| $SiO_2$ | 57.00-66.50 |
| $Al_2O_3$ | 17.00-23.00 |
| $Na_2O$ | 7.90-10.00 |
| CaO | 2.50-12.80 |

Preferably, the synthetic silicate granules comprise 58.00-65.00 wt. % of $SiO_2$ based on the weight of the synthetic silicate granules.

The synthetic silicate granules comprise preferably 18.00-22.00 wt. % of $Al_2O_3$ based on the weight of the synthetic silicate granules.

The synthetic silicate granules comprise preferably 8.50-10.50 wt. % of $Na_2O$ based on the weight of the synthetic silicate granules.

The synthetic silicate granules comprise preferably 3.50-12.80 wt. % of CaO based on the weight of the synthetic silicate granules.

In a preferred embodiment, the synthetic silicate granules are characterized by a composition which comprises oxides according to the following ranges in weight percent, based on the weight of the granules:

|   | Range (wt. %) |
|---|---|
| $SiO_2$ | 58.00-65.00 |
| $Al_2O_3$ | 18.00-22.00 |
| $Na_2O$ | 8.50-10.50 |
| CaO | 3.50-12.80 |

There might be other inorganic oxides present in the composition of the synthetic silicate granules, as well as some organic matter or material which is calcined and desorbed during the XRF analysis at 1050° C. until there is no more weight lost (known as weight 'lost on ignition' or L.O.I.).

Nevertheless, the sum of the weight percentages of the $SiO_2$, $Al_2O_3$, CaO and $Na_2O$ in the granules is preferably at least 85 wt. %, or at least 90 wt. %, or even at least 95%, based on the weight of the granules. The sum of the weight percentages of the $SiO_2$, $Al_2O_3$, $Na_2O$ and CaO in the granules is preferably in the range 85.00-99.80 wt. %, preferably 90.00-99.50 wt. %, or 95.00-99.50 wt. %, based on the weight of the granules. Preferably, the rest being other inorganic oxides and other matter lost on ignition (L.O.I.).

Also, preferably, the L.O.I. is lower than 4.00 wt. %, more preferably lower than 1.00 wt. %, or lower than 0.50 wt. %, based on the weight of the granules. In a further embodiment, the amount of L.O.I. is in the range 0.01-1.00 wt. %, or 0.01-0.50 wt. %, based on the weight of the granules.

The synthetic silicate granules may further comprise MgO in the composition, preferably in a range 0.01-7.00 wt. %, or 0.05-5.00 wt. %, based on the weight of the granules.

The synthetic silicate granules might further comprise $K_2O$ in a range 0.05-2.00 wt. %, or 0.10-1.00 wt. %, or 0.10-0.50 wt. % relative to the weight of the granules.

Iron oxides, and particularly $Fe_2O_3$, might be present in the composition of the granules, however, preferably, the average concentration of $Fe_2O_3$ is ≤0.50 wt. %, or more preferably ≤0.10 wt. %, based on the weight of the granules. In an embodiment, iron oxides, and particularly $Fe_2O_3$, might be present in the composition of the granules in a concentration of 0.00-0.50 wt. %, or more preferably 0.00-0.10 wt. %, based on the weight of the granules. In a further embodiment, iron oxides, and particularly $Fe_2O_3$, might be present in the composition of the granules in a concentration of 0.01-0.50 wt. %, or more preferably 0.01-0.10 wt. %, based on the weight of the granules.

Titanium dioxide $TiO_2$ might also be present in the composition of the granules. In that case, the average concentration of $TiO_2$ in the granules is 0.50 wt. %, preferably ≤0.10 wt. %, based on the weight of the granules. In an embodiment, $TiO_2$ might be present in the composition of the granules in a concentration of 0.00-0.10 wt. %, or more preferably 0.00-0.10 wt. %, based on the weight of the granules. In a further embodiment, $TiO_2$ might be present in the composition of the granules in a concentration of 0.01-0.50 wt. %, or more preferably 0.01-0.30 wt. %, based on the weight of the granules.

The concentration of both $Fe_2O_3$ and/or $TiO_2$ can be adjusted to this low ranges by selection of raw materials with particularly low levels of those oxides.

Further, in preferred embodiments, the water content of the synthetic silicate granules is preferably <0.50 wt. %, more preferably <0.10 wt. %, based on the weight of the granules. It has been found that if water content is higher, the hardening of the binder, e.g. the curing of the resin, and the adhesion of the granules to the binder, might be detrimentally affected. As an additional advantage of the synthetic silicate granules of the invention in comparison with glass frits, the first granules do not require a drying step to achieve the mentioned level of water content, while glass frits do (glass frits are often produced by pouring the molten glass to cold water).

Therefore, in a preferred embodiment, the synthetic silicate granules may comprise 0.00-0.50 wt. % of water, more preferably 0.00-0.10 wt. %, based on the weight of the granules. In a further embodiment, the synthetic silicate granules may comprise 0.01-0.50 wt. % of water, more preferably 0.01-0.10 wt. %, based on the weight of the granules.

According to an embodiment, the synthetic silicate granules of the different aspects of the invention are characterized by a composition which comprises oxides according to the following ranges in weight percent, based on the weight of the synthetic silicate granules:

|  | Range (wt. %) |
| --- | --- |
| $SiO_2$ | 57.00-66.50 |
| $Al_2O_3$ | 17.00-23.00 |
| $Na_2O$ | 7.90-10.50 |
| CaO | 2.50-12.80 |
| MgO | 0.01-7.00 |
| $K_2O$ | 0.05-2.00 |
| $Fe_2O_3$ | 0.00-0.50 |
| $TiO_2$ | 0.00-0.50 |

According to another embodiment, the synthetic silicate granules of the different aspects of the invention are characterized by a composition which comprises oxides according to the following ranges in weight percent, based on the weight of the synthetic silicate granules:

|  | Range (wt. %) |
| --- | --- |
| $SiO_2$ | 57.00-66.50 |
| $Al_2O_3$ | 17.00-23.00 |
| $Na_2O$ | 7.90-10.00 |
| CaO | 2.50-12.80 |
| MgO | 0.01-7.00 |
| $K_2O$ | 0.05-2.00 |
| $Fe_2O_3$ | 0.00-0.50 |
| $TiO_2$ | 0.00-0.50 |

In a further embodiment, the synthetic silicate granules comprise oxides according to the following ranges in weight percent, based on the weight of the synthetic silicate granules:

|  | Range (wt. %) |
| --- | --- |
| $SiO_2$ | 58.00-65.00 |
| $Al_2O_3$ | 18.00-22.00 |
| $Na_2O$ | 8.50-10.50 |
| CaO | 3.50-12.80 |
| MgO | 0.05-5.00 |
| $K_2O$ | 0.10-1.00 |
| $Fe_2O_3$ | 0.01-0.50 |
| $TiO_2$ | 0.01-0.50 |

The synthetic silicate granules may comprise silica in crystalline form (as quartz or cristobalite). However, preferably, the crystalline silica concentration in the granules is ≤7 wt. %, or ≤5 wt. %, or even ≤3 wt. %, based on the weight of the granules. In an embodiment, the crystalline silica concentration in the granules is in the range 0.0-7.0 wt. %, or 0.0-5.0 wt. %, or even 0.0-3.0 wt. %, based on the weight of the granules. In an embodiment, the crystalline silica concentration in the granules is in the range 0.1-7.0 wt. %, or 0.5-5.0 wt. %, or 0.5-3.0 wt. %, or even 1.0-3.0 wt. %, based on the weight of the granules. The low crystalline silica content in the synthetic silicate granules is a consequence of the low crystalline content of the raw materials used for their production, and of the partial vitrification during thermal treatment.

The synthetic silicate granules are preferably not frits, meaning that they are not produced by fusing/melting fully a glass composition which is rapidly cooled (quenched). The synthetic silicate granules are preferably made of sintered material, meaning that they are obtained by a sintering process of inorganic raw materials. In other words, the synthetic silicate granules are preferably not fully, of substantially not fully, amorphous, and the crystalline phase in the granules is preferably >0.5 wt. %, or in the range 1.0-5.0 wt. %, in relation to the weight of the granules. The synthetic silicate granules are preferably ceramic granules.

The term "ceramic granules" refers to granules consisting of inorganic, non-metallic compounds, that are consolidated in solid state by means of high temperature heat treatments (firing, sintering) and are formed by a combination of crystalline and glassy phases.

In preferred embodiments of the invention, the amount of the crystalline phase albite ($NaAlSi_3O_8$) accounts for 0.5-5.0 wt. % of the weight of the synthetic silicate granules. The amount of crystalline silica and albite in the synthetic silicate granules can be determined by powder X-Ray Diffraction analysis (XRD) using the Rietveld method for quantification, a technique amply used in the field.

The total content of crystalline phases in the synthetic silicate granules according to any aspect of the invention is preferably ≤10.0 wt. %, or ≤5.0 wt. % of the weight of the granules, the rest being amorphous phase. In preferred embodiments of the invention, the amount of the crystalline phases in the synthetic silicate granules according to any aspect of the invention is preferably 0.5-10.0 wt. %, or 1.0-5.0 wt. % of the weight of the granules.

Preferably, the synthetic silicate granules according to the aspects of the invention might have a particle size in a range from 4.5-0.063 mm (grain particles) or it might be lower than 63 micrometers (micronized powder). In the case of grain particles, the particle size might range from 1.2-0.1 mm, or 0.7-0.1 mm, or 0.4-0.1 mm, or 0.3-0.063 mm. In the case of micronized powder, the powder might have a particle size distribution with a D90<50 micrometers, preferably <40 micrometers, and more preferably the D90 might be between 10-40 micrometers. Optionally, different fractions of synthetic silicate granules, with different particle size distribution, may be included in the artificial agglomerate article of the invention.

Synthetic silicate granules according to the present invention can be prepared by a process comprising:
(a) preparing a mixture comprising feldspar and a modifier, preferably wherein the weight ratio of feldspar to the modifier is from 95:5 to 70:30;
(b) compacting the mixture of step (a); and
(c) sintering the compacted mixture of step (b).

The term modifier is employed to refer to inorganic oxide compounds, which are employed to either increase the content of $Na_2O$ or $CaO$, or to increase $Al_2O_3$ content, in the resulting synthetic silicate granules.

The modifier is preferably selected from calcite, dolomite, kaolin or mixtures thereof.

As used herein, sintering shall be understood as the process of subjecting an inorganic mixture to a thermal treatment (normally over 900° C.) to form a solid mass from the starting materials, by their partially fusion and reaction, but without reaching the point of full liquefaction.

The sintering might be conducted in a furnace at temperatures of 900-1,450° C., preferably 900-1,300° C. Preferably, the sintering temperature is not higher than 1,450° C.

Felspars are aluminosilicates containing sodium, potassium, calcium or barium. The felspar is preferably a sodium feldspar (albite), more preferably sodium feldspar of high purity with >10 wt. % NaO and 0-0.1 wt. % $Fe_2O_3$, with low quartz content, preferably of 0.1-10.0 wt. % based on the weight of the feldspar material. This type of feldspar is extracted from mines and commercialized by companies such as Sibelco or Imerys.

The modifier is preferably calcite. Thus, the synthetic silicate granules might be prepared from a mixture comprising feldspar and calcite. Calcite (calcium carbonate) can be used as such, or it can be used in calcined form (calcium oxide, quicklime). Both calcium carbonate and calcium oxide might be interchangeably or simultaneously used as a source of calcium. Calcite as such (calcium carbonate) is however preferred, since it is vastly availability in large amounts and with high purity, extracted from natural rock minerals and ground/classified by different suppliers, at a comparatively lower cost. The calcite has preferably 50-56 wt. % of CaO and <0.1 wt. % of $Fe_2O_3$, based on the weight of the calcite.

Alternatively, the modifier is preferably dolomite. Dolomite refers preferably to dolomite (mineral formed mainly by $CaMg(CO_3)_2$) with 18-48 wt. % of MgO and <0.1 wt. % $Fe_2O_3$, based on the weight of the dolomite.

In further embodiments, the modifier might be kaolin. The kaolin is preferably white kaolin, a low iron kaolin of high purity, which is a natural clay mined and available from different suppliers, for example Imerys, Sibelco, among others. The kaolin comprises preferably >80 wt. % of kaolinite ($Al_2Si_2O_5(OH)_4$), with >30 wt. % of $Al_2O_3$ content and 0-0.1 wt. % $Fe_2O_3$, based on the weight of the kaolin.

Kaolin refers to a clay containing the mineral kaolinite as its principal constituent. Preferably, kaolinite is the only plastic component in kaolin. Kaolin may further contain other impurities, such as quartz, mica, phosphates, fine clay impurities such as certain smectite clay constituents and various other species, e.g. compounds containing transition elements. In a particular embodiment, kaolin comprises at least 80 wt. % of kaolinite, based on the weight of kaolin.

The weight ratio of feldspar to the modifier is preferably selected in the range 95:5-70:30. In other words, preferably this formula applies:

$$2.33 < \frac{\text{Weight feldspar}}{\text{Weight modifier}} < 19$$

In preferred embodiments, the kaolin and the modifier accounts for more than 85 wt. %, or >90 wt. %, or >95 wt. % of the mixture to be sintered.

In further alternative embodiments, the synthetic silicate granules may be obtained by sintering a mixture comprising feldspar (preferably sodium feldspar 'albite'), and a modifier comprising kaolin, and calcite (as such or calcined). The percentage weight ranges in the mixture might be in the following ranges, based on the weight of the mixture to be sintered:

| | |
|---|---|
| Feldspar | 70-80 wt. % |
| Kaolin | 10-15 wt. % |
| Calcite | 10-15 wt. % |

Preferably, the synthetic silicate granules are produced by a method that does not involve any step in which the temperature is increased above 1,450° C. for more than 5 minutes, or for any extension of time.

In the embodiments according to the different aspects of the invention, the mixture to be sintered is preferably introduced in the sintering furnace in granular form, as spheres, grains, pellets, briquettes or the like, preferably with a maximum size in any dimension ≤10 mm, preferably ≤5 mm, and even more preferred ≤4.5 mm. The minimum size of the granular form in any dimension is preferably ≥0.045 mm, more preferably ≥0.060 mm.

Preferentially, the materials feldspar and modifier comprised in the mixture to be sintered are ground and selected to have a particle size of <150 micrometers, or preferably <100 micrometers, and preferably >1 micrometers, before they are mixed and compacted. The small raw material particle size translates into a more homogeneous mixing and more efficient sintering, what means that less energy is necessary to produce the sintering of the mixture and the synthetic silicate granules obtained present less defects, inclusions or inhomogeneities.

The materials comprised in the mixture to be sintered are mixed, homogenized and compacted before they are introduced into a sintering furnace. Optionally, agglomerating additives such as carboxymethylcellulose (CMC), water, bentonite and/or polyvinylalcohol, can be added to facilitate the mixture and the subsequent compaction. Agglomeration additives are preferably used in small amounts, preferably 0-5 wt. %, based on the weight of the mixture to be sintered.

The mixture to be sintered can be compacted by different techniques known in the art. For example, the compaction can be achieved with an axial press or continuous belt press, by extrusion or by a granulator.

Preferably, the mixture to be sintered is granulated by a ceramic granulator (as those used in the ceramic industry for granulating clay mixtures), to rounded or spherical particles before they are introduced into the sintering furnace.

The density of the granules to be introduced into the sintering furnace preferably ranges 1.0-1.5 g/cm³. The limited granular size of the mixture favors heat transfer into the bulk of the mixture and facilitates a more homogeneous and efficient sintering, reducing the required temperature and the time of residence of the mixture in the furnace. A further advantage of the granular form of the compacted mixture is that the size and shape before sintering can be chosen in relation to the size and shape of the desired sintered synthetic silicate granules to be used in the artificial agglomerate stone.

The mixture to be sintered, preferably in granular form, is introduced into a heated furnace to achieve its calcination, sintering and ultimately the transformation of the raw materials into a single mass of mixed crystalline and amorphous character. The thermal treatment is preferably conducted at a temperature <1,450° C., or <1,300° C., or in other words, preferably the manufacture of the synthetic silicate granules does not involve any step in which the temperature is increased above 1,450° C., or 1,300° C., for more than 5 minutes, or for any extension of time. Depending on the size and shape of the compacted mixture introduced into the furnace, the sintering temperatures may range from 900-1,450° C., or 1,000-1,300° C. for 5-60 minutes, preferably for 5-30 minutes. In comparison with the manufacture of glass ceramics, where full melting of the materials is required, the synthetic silicate granulates can be produced at a lower temperature and/or reduced furnace residence time, what is economically significantly advantageous. Further, at high temperatures such as those above 1,450° C., cristobalite might start to crystalize from the $SiO_2$ present in the mixture, increasing the total crystalline silica content.

Furnaces for the sintering of the mixture can be any of those used in the art for firing or calcinating ceramic materials, such as rotary or tunnel kilns, conveyor furnaces, fluidized bed furnaces, furnaces for firing ceramic beads, vertical or bottom-up furnaces, etc. The furnaces can be designed for batch or continuous operation. Preferably, the sintering is produced in fluidized bed furnace or a furnace for the fabrication of ceramic (or glass) beads, to avoid the mixture adhering to the walls of the furnace.

After the thermal treatment, the sintered product is ground and/or classified according to the desired particle size distribution (granulometry). The grinding and/or classification (sieving) can be achieved by methods currently known in the art, such as ball mineral grinding mills or opposed grinding rollers. The grinding may also comprise micronizing the sample to obtain granules with a particle size <65 micrometers, or to a powder with a particle size distribution having a D90<50 micrometers.

In an aspect, the invention refers to the synthetic silicate granules obtained by the process disclosed herein.

The inventors made the unprecedented observation that the synthetic silicate granules according to the invention, characterized by the claimed composition, present an excellent transparency and lightness, with little color deviation from the color of quartz granules commonly used in the manufacture of quartz surfaces. The synthetic silicate granules are furthermore hard and with good resistance to chemical attack. It is also observed that when mixed with the unhardened binder, the amount of liquid binder absorbed by the granules is comparable or lower to the amount absorbed by quartz or cristobalite granules. This feature is particularly relevant for the small particle sizes, for the micronized granules. It needs to be understood that the low absorption of liquid binder of this micronized fraction is an advantage in the manufacture of artificial agglomerate articles, since high amounts of absorbed unhardened binder requires the use of higher amounts of this binder, which is more expensive, in order to achieve the same cohesion and granule anchorage. The crystalline silica content of the synthetic silicate granules is very low, of 7 wt. % or lower, reducing drastically the health risks caused by inhalation of respirable crystalline silica. This combination of features allows the replacement of at least part of the quartz and/or cristobalite currently used in the manufacture of quartz surfaces, without having to modify importantly the current formulations and/or manufacturing processes, and without deteriorating the performance and the visual appearance of these products. The use of the synthetic silicate granules instead of quartz and/or cristobalite in artificial agglomerate articles reduces the crystalline silica emissions produced when these articles are mechanized.

Therefore, in another aspect, the invention is directed to the use of the synthetic silicate granules of the invention for the manufacture of an artificial agglomerate stone material or article. This use reduces the crystalline silica emissions during manufacturing or mechanizing the artificial agglomerate stone material or article, compared to agglomerate quartz material or articles.

Accordingly, in a particular embodiment, the invention is directed to the use of the synthetic silicate granules of the invention for the manufacture of an artificial agglomerate stone material or article, to reduce the emissions of crystalline silica when the material is manufactured and/or mechanized.

Other aspect of the invention refers to an artificial agglomerate stone material or article comprising inorganic fillers and a hardened binder, wherein the inorganic fillers comprise the synthetic silicate granules of the invention.

The amount of synthetic silicate granules in the artificial agglomerate stone material preferably ranges from 1-70 wt. %, or from 1-50 wt. %, or from 1-30 wt. % in relation to the weight of the material.

The artificial agglomerate stone material might comprise also inorganic fillers different from the synthetic silicate granules of the invention, preferably selected from stone, stone-like or ceramic materials. Preferably, the inorganic fillers (i.e. the sum of the weights of the synthetic silicate granules and of the inorganic fillers different from the synthetic silicate granules of the invention) account for at least 70 wt. %, or at least 80 wt. %, or at least 85 wt. %, and at most 95 wt. %, of the weight of the artificial agglomerate stone material.

In equally preferred embodiments, in addition to the synthetic silicate granules according to the invention, the artificial agglomerate stone material further comprises other inorganic fillers selected from feldspar granules, recycled silicate glass granules, silicate frit granules, ceramic granules, or mixtures thereof.

In any aspect of the invention, it is particularly preferred when the synthetic silicate granules comprised in the artificial agglomerate stone article have a particle size 0.1 mm. In addition, in preferred embodiments the amount of synthetic silicate granules with a particle size ≥0.1 mm is 50-75 wt. % in relation to the weight of the artificial agglomerate stone material.

The hardenable binder is preferably an organic thermosetting resin, liquid and which may be selected from the group made up of unsaturated polyester resins, methacrylate-based resins, vinyl resins and epoxy resins. These hardenable organic resins are preferably reactive and can be hardened in a curing (or cross-linking) reaction.

The hardening of the binder, and thus, of the mixture after compaction, can ultimately be accelerated by raising the temperature, depending on the binder used, and/or by using suitable catalysts and accelerators.

The amount of hardened binder in the artificial agglomerate stone material may range from 5-30 wt. %, or from 5-20 wt. %, or from 5-15 wt. %, based on the weight of the material.

In an embodiment, the artificial agglomerate stone material comprises 70-95 wt. %, preferably 80-95 wt. %, of inorganic fillers (i.e. the sum of the weights of the synthetic silicate granules and of the inorganic fillers different from the synthetic silicate granules of the invention) and 5-30 wt. %, preferably 5-20 wt. %, of hardened binder, based on the weight of the artificial agglomerate stone material.

According to preferred embodiments, the artificial agglomerate stone article has been obtained by vacuum vibrocompaction and has preferably an apparent density in the range 2000-2600 kg/m$^3$, or from 2100-2500 kg/m$^3$. Apparent density of the artificial agglomerate stone article might be measured according to EN 14617-1:2013-08.

The artificial agglomerate stone material may be in the form of a block, slab, tile, sheets, board or plate.

The artificial agglomerate stone material might be used for construction or decoration, for manufacturing counters, kitchen countertops, sinks, shower trays, walls or floor coverings, stairs or similar.

The invention is also concerned with a process for preparing the artificial agglomerate stone material of the invention, comprising:
   a) mixing a hardenable binder and the inorganic fillers comprising the synthetic silicate granules of the invention,
   b) vacuum vibrocompacting the unhardened mixture obtained in a), and
   c) hardening the compacted mixture obtained in b).

In an embodiment, vacuum vibrocompacting the unhardened mixture obtained in a) is performed in a mold or a supporting sheet.

For the manufacture of the artificial agglomerate article, a hardenable binder, such as a liquid organic resin, is mixed with the synthetic silicate granules, and with any optional inorganic fillers different than the synthetic silicate granules forming an (unhardened) agglomerate mixture. The amount of synthetic silicate granules is preferably 1-70 wt. %, or 1-50 wt. %, or 1-30 wt. % of the weight of the agglomerate mixture. The sum of the weights of the synthetic silicate granules and the optional inorganic fillers different than the synthetic silicate granules is preferably at least 70 wt. %, or at least 80 wt. %, or at least 85 wt. % of the weight of the agglomerate mixture. Preferably, the amount of hardenable binder in the agglomerate mixture ranges from 5-30 wt. %, or from 5-15 wt. %.

In preferred embodiments, the synthetic silicate granules are produced by sintering a mixture according to previous embodiments, comprising feldspar and a modifier selected from kaolin, calcite, dolomite, or mixtures thereof.

The mixing can be achieved, for example, by stirring with the use of conventional mixers, in a manner known in the art. The hardenable binder might be an organic resin, which once hardened, serves to achieve cohesion and adherence between the inorganic fillers in the produced article. The organic resins are preferably thermosetting, liquid and can be selected, for example, from the group made up of unsaturated polyester resins, methacrylate-based resins, vinyl resins and epoxy resins. These resins are preferably reactive and harden in a curing or cross-linking reaction. Additionally, additives can be included in this mixing step, selected from pigments, curing catalysts, curing accelerators, UV stabilizers, or mixtures thereof.

The optional inorganic fillers different than the synthetic silicate granules might be selected from stone, stone-like or ceramic materials, e.g. in granule form. These fillers may be incorporated to the agglomerate mixture with different particle sizes and can be obtained from the crushing and/or grinding of natural or artificial materials. These inorganic fillers can be sourced, for example, from specialized companies, which commercialize them already dry and classified according to their particle size.

Artificial agglomerate stone materials with a low crystalline silica content are preferred. Therefore, it is preferred that all, or at least 95 wt. %, or at least 90 wt. % or at least 80 wt. %, of the other inorganic fillers different from the synthetic silicate granules of the invention have a low crystalline silica content, preferably a crystalline silica (quartz, cristobalite or other crystalline polymorphs) content of 0-15 wt. %, or 0-10 wt. %, or 0-7 wt. % relative to the weight of said other inorganic fillers. Preferably, at least 80%, more preferably at least 90 wt. %, of the other inorganic fillers different from the synthetic silicate granules have a crystalline silica content of 0-7 wt. % relative to the weight of said other inorganic fillers.

In particularly preferred embodiments, the artificial agglomerate stone material or article comprises 0-5 wt. %, or 0-1 wt. %, relative to the weight of the agglomerate stone material or article, of inorganic fillers different than the synthetic silicate granules, with a crystalline silica (quartz, cristobalite or other crystalline polymorphs) content of >7 wt. %, or >10 wt. %, or >15 wt. % relative to the weight of said inorganic fillers.

It is preferred that the artificial agglomerate stone material comprises from 0-5 wt. % relative to the weight of the material, of inorganic fillers (i.e. the sum of the weights of the synthetic silicate granules and of the inorganic fillers different from the synthetic silicate granules of the invention) with a content of crystalline silica of 15-100 wt. % relative to the weight of the inorganic fillers.

Preferably, the crystalline silica content of the artificial agglomerate stone material is ≤15 wt. %, more preferably ≤10 wt. %, ≤5 wt. % relative to the weight of the material. The crystalline silica content of the artificial agglomerate stone material may be 0-15 wt. %, more preferably 0-10 wt. %, or 0-5 wt. %, relative to the weight of the material.

The inorganic fillers different than the synthetic silicate granules are preferably selected from feldspar granules, recycled silicate glass granules, silicate frit granules, ceramic granules, or mixtures thereof. It needs to be understood that the inorganic fillers, i.e. granules different than the synthetic silicate granules have a composition of oxides different to the composition of the synthetic silicate granules of the invention here.

The agglomerate mixture may comprise other typical additives, such as colorants or pigments, accelerators or catalyzers for the curing or hardening of the resin (e.g. free radical initiators), promoters for the adhesion between the filler and the resin (e.g. silanes). These types of additives and the proportion used thereof are known in the state of the art.

Preferably, these additives may be present in the agglomerate mixture in an amount of 0.01-5.00 wt. %, based on the weight of the mixture.

The (unhardened) agglomerate mixture may be then transported to a distributor device. Distributors suitable are known, such as those used for the distribution of the (unhardened) agglomerate mixtures in the manufacture of quartz agglomerate surfaces. This distributor device is preferably movable along the length of a temporary mold or supporting sheet and preferably consists of a feeding hopper that receives the mixture in the top opening thereof and a conveyor belt positioned below the bottom outlet opening of the hopper, which collects or extracts the mixture from the hopper and deposits it into the mold or supporting sheet. Other distributor devices are possible within the general concept of the invention.

The (unhardened) agglomerate mixture having been distributed in the mold or supporting sheet is preferably covered with a protective sheet on its top surface and subjected to vacuum vibrocompaction. For this, in an example, the mixture is transported inside a compaction area of a press, wherein it is inserted in a sealable chamber. Then, the chamber is sealed, and vacuum is created with appropriate gas evacuation pumps. Once the desired vacuum level has been reached (e.g. 5-40 mbar), the ram of the press exerts a compaction pressure simultaneously with the application of vertical vibration of the piston (e.g. oscillating at 2.000-4.000 Hz). During the vacuum vibrocompaction, the air entrapped in the agglomerate mixture is substantially evacuated.

The compacted mixture then goes to a hardening or curing stage. In this stage, depending on the type of resin, as well as the use or not of any suitable catalysts or accelerants, the mixture is suitably subjected to the effect of temperature in a curing oven, suitably heated at a temperature between 80-120° C., with residence times in the oven generally varying from 20 to 60 minutes. After curing, the hardened compacted mixture is cooled down to a temperature equal to or less than 40° C.

After hardening, the artificial agglomerate article obtained, which can be shaped as blocks, slabs, boards or plates, can be cut and/or calibrated to the desired final dimensions, and may be finished (polished, honed, etc.) on one or both of its larger surfaces, depending on the intended application.

It should be understood that the scope of the present disclosure includes all the possible combinations of embodiments disclosed herein.

EXAMPLES

Definitions and Testing Methods

XRF: Oxide analysis of the granules might be conducted by X-Ray Fluorescence in a commercial XRF spectrometer. For example, a disc of about 1 g of a sample is mixed with lithium tetraborate and calcined in air atmosphere at a temperature 1.050° C. for 25 minutes prior to analysis in the spectrometer. The results are reported as relative weight percentage of oxides ($SiO_2$, $Al_2O_3$, etc.), together with the weight 'lost on ignition' during calcination (evaporation/desorption of volatiles, decomposition of organic matter). The spectrometer is previously calibrated with multipoint calibration curves of known concentration of standards.

XRD: As way of example, the identification and quantification of crystalline phases in the granules can be done by powder X-Ray Diffraction (XRD) using $MoK\alpha_1$ radiation (0.7093 Å) with a commercial equipment (e.g. Bruker D8 Advance) at 2°-35° for 4 hours. Once the X-ray diffraction data is obtained, it is analyzed using the Rietveld method for quantification. The content of crystalline silica phases is calculated as weight percentage of the sample analyzed.

Granulometry: The particle size, also called particle diameter, of the granules can be measured by known screening separation using sieves of different mesh size. For synthetic silicate granules with a particle size <200 micrometers, the particle size distribution can be measured by laser diffraction with a commercial equipment (e.g. Malvern Panalytical Mastersizer 3000 provided with a Hydro cell). For the measurement the granule sample might be dispersed in demineralized water assisted by an ultrasound probe. The laser diffractomer provides particle distribution curves (volume of particles vs. particle size) and the D10, D50 and D90 statistical values of the particle population (particle size values where 10%, 50% or 90% of the sample particle population lies below this value, respectively).

Colorimetry/transparency: Colorimetry and transparency of the granules in polymerized matrix can be measured from disks prepared by mixing 50 g of the granules with 50 g of a commercial unsaturated polyester resin catalyzed with 0.75 g of organic MEKP peroxide and 0.12 g of cobalt octoate (6% cobalt). After homogenization, the mixture is poured to an aluminum mold up to a thickness of 5 mm. The mixture is then hardened at 70° for 20 minutes and allowed to reach room temperature afterwards for 30-40 minutes. The aluminum mold is then removed before the colorimetry and transparency of the obtained disk is measured. The colorimetry may be measured in a commercial spectrophotometer (e.g. Konica Minolta CM-3600d) and expressed in values of L* a* b* coordinates (CIELAB color space), where L* is lightness from black (0) to white (100), a* from green (−) to red (+) and b* from blue (−) to yellow (+). Transparency may be measured in a commercial transparency analyzer (e.g. from Sensure SRL) capable of measuring the ratio of white light transmitted through the disk.

Resin absorption: The absorption of resin is measured by adding commercial liquid unsaturated polyester resin dropwise from a burette to 5.0 g of a sample of the granules placed on a glass plate. The mass of granules and oil is rubbed and mixed thoroughly with a stainless-steel spatula. Drops of resin are added until the mass reaches the consistency of a stiff, putty-like paste that does not break or separate, with a dry appearance, and which remains adhered to the spatula (called the "pick-up" point). In that moment, the amount of resin used to reach the pick-up point is recorded and the resin absorption calculated as % in relation to the initial weight of the sample.

In an Example 1, a mixture was prepared under efficient stirring by contacting 90 weight parts of commercial highly pure floated sodium feldspar with a NaO content of >10 wt. % and $Fe_2O_3$ of <0.1 wt. %, with an average particle size <100 micrometers, and 10 weight parts of highly pure calcite of >98 wt. % purity, >54 wt. % of CaO and <0.05 wt. % of $Fe_2O_3$, with an average particle size <5 micrometers.

The mixture obtained was then compacted in an axial press with a pressure of 420 kg F/$cm^2$.

After compaction, the granules of mixture were then located into a crucible and entered to a muffle-type furnace which is then set to 1280° C. The mixture was left inside the furnace for 12 minutes at the maximum temperature, in which period it underwent sintering. Afterwards, the sintered granules were left to slowly cool-down to room temperature. Half of the granules obtained were subjected to grinding and/or micronizing. The granules, as produced or ground/ micronized, were then classified by sieving according to fractions of different particle size ranges.

Table 1 depicts the average composition of the synthetic silicate granules obtained in this Example 1 measured by FRX:

TABLE 1

| | L.O.I. | $SiO_2$ | $Al_2O_3$ | $Na_2O$ | CaO | $K_2O$ | MgO | $Fe_2O_3$ | $TiO_2$ | Other oxides |
|---|---|---|---|---|---|---|---|---|---|---|
| wt. % | 0.96 | 63.80 | 18.27 | 9.71 | 6.61 | 0.39 | 0.12 | 0.03 | 0.03 | 0.08 |

The hardness of the synthetic silicate granules of Example 1 is 5.5 in the Mohs scale. The average content of crystalline silica in the synthetic silicate granules of Example 1, as measured by DRX with the Rietveld quantification method, is 1.0 wt. % in the form of quartz. The content of crystalline phase albite is 1.0 wt. %.

The colorimetry and transparency of the synthetic silicate granules having different granulometry obtained in Example 1, in a polymerized resin matrix, is shown in Table 2, together with the colorimetry and transparency of quartz and cristobalite granules of similar granulometry for comparison.

TABLE 2

| | Colorimetry | | | Transparency % light transmitted | Resin absorption wt. % |
|---|---|---|---|---|---|
| | L* | a* | b* | | |
| Granules of Example 1 Particle size range 0.1-0.4 mm | 83.0 | 0.4 | 4.0 | 24.8 | — |
| Granules of Example 1 Particle size range 0.3-0.7 mm | 80.9 | −0.1 | 5.3 | 28.4 | — |
| Cristobalite particle size 0.1-0.4 mm | 87.6 | 0.9 | 2.4 | 16.1 | — |
| Quartz, particle size 0.1-0.4 mm | 84.4 | 0.4 | 4.8 | 20.5 | — |
| Quartz, particle size 0.3-0.7 mm | 80.4 | 0.4 | 5.3 | 31.8 | — |
| Micronized granules of Ex. 1 D90 = 36.8 micrometers | 70.9 | 0.4 | −1.6 | 19.0 | 24 |
| Micronized cristobalite, D90 = 23.0 micrometers | 81.9 | 0.7 | 1.2 | 9.0 | 37 |
| Micronized quartz, D90 = 27.1 micrometers | 55.5 | 0.6 | −1.2 | 25.5 | 25 |

The absorption of resin of the micronized synthetic silicate granules of the Example 1 is presented in Table 2, together with the absorption values obtained for micronized quartz and cristobalite granules of similar particle size.

The quartz and cristobalite granules included in Table 2 as reference as commercial materials currently being used in the manufacture of artificial agglomerate quartz stone articles.

As can be seen from the results presented here, the synthetic silicate granules can be produced from readily available raw materials and at a competitive cost. The granules have furthermore a combination of characteristic which make them suitable as toxicologically safer material for replacing quartz or cristobalite granules in the manufacture of artificial agglomerate stone articles, without having to change the materials and processes normally used for the manufacture of quartz agglomerate surfaces. These features are:

Can be obtained by thermal transformation at temperatures <1450° C.

Have high hardness and good chemical/mechanical resistance.

Show very low content of crystalline silica and/or other toxicologically problematic substances (such as lead, cadmium, etc.)

Present high transparency and lightness, similar or superior to quartz or cristobalite. The color tonalities of the synthetic silicate granules are not significantly shifted from those of quartz or cristobalite, the differences being low enough to be possible the color adjustment with pigments.

The absorption of resin of the micronized synthetic silicate granules is not higher than the absorption of either quartz or cristobalite micronized granules.

The synthetic silicate granules obtained in Example 1 were used for the manufacture of artificial agglomerate stone slabs in an industrial setting, in standard lines for the production of commercial quartz agglomerate surfaces.

Micronized synthetic silicate granules with a D90 of 36.8 micrometers were used to replace partially or fully the micronized cristobalite normally used. On the other hand, the synthetic silicate granules of Example 1 with a particle size distribution 0.1-0.4 mm were used to replace partially or fully the quartz granules of similar granulometry normally used.

In all the cases, the slabs could be manufactured without problems or important changes in the current production process, only with a slight adjustment of the concentration of the pigments used. The slabs comprising the synthetic silicate granules showed similar characteristics regarding resistance to abrasion, scratch, staining or chemical attacks as the slabs produced with cristobalite and quartz. However, the slabs with the inventive granules contained a lower content of crystalline silica, which resulted in lower emission of respirable crystalline silica when the slabs were cut, gauged and/or polished.

The invention claimed is:

1. Artificial agglomerate stone material comprising inorganic fillers and a hardened binder, wherein the inorganic fillers comprise synthetic ceramic silicate granules comprising:
- 57.00-66.50 wt. % of $SiO_2$,
- 17.00-23.00 wt. % of $Al_2O_3$,
- 7.90-10.50 wt. % of $Na_2O$, and
- 2.50-12.80 wt. % of CaO, based on the weight of the synthetic ceramic silicate granules,
wherein an amount of crystalline phases in the synthetic ceramic silicate granules is 0.5-10.0 wt. % of the weight of the granules,
and wherein the binder is an organic resin.

2. Artificial agglomerate stone material according to claim 1, wherein:
the inorganic fillers further comprise inorganic fillers different than the synthetic silicate granules selected from feldspar granules, recycled silicate glass granules, silicate frit granules, ceramic granules, and mixture thereof.

3. Artificial agglomerate stone material according to claim 1, comprising from 0-5 wt. % relative to the weight of the material, of inorganic fillers with a content of crystalline silica of 15-100 wt. % relative to the weight of the inorganic fillers.

4. Artificial agglomerate stone material according to claim 1, wherein:
the amount of synthetic ceramic silicate granules is from 1 to 70 wt. % based on the weight of the artificial agglomerate stone material.

5. Artificial agglomerate stone material according to claim 1, characterized in that it has an apparent density from 2000-2600 kg/m$^3$.

6. Artificial agglomerate stone material according to claim 5, characterized in that it is produced in a method including a vacuum vibrocompaction step.

7. Artificial agglomerate stone material according to claim 1, wherein the amount of inorganic fillers is at least 70 wt. % based on the weight of the artificial agglomerate stone material.

8. Artificial agglomerate stone material according to claim 1, wherein the amount of inorganic fillers is at least 80 wt. % based on the weight of the artificial agglomerate stone material.

9. Artificial agglomerate stone material according to claim 1, wherein the amount of synthetic ceramic silicate granules with a particle size >0.1 mm is 50-75 wt. % in relation to the weight of the artificial agglomerate stone material.

10. Artificial agglomerate stone material according to claim 1, wherein the granules comprise:
- 57.00-66.50 wt. % of $SiO_2$,
- 17.00-23.00 wt. % of $Al_2O_3$,
- 7.90-10.00 wt. % of $Na_2O$, and
- 2.50-12.80 wt. % of CaO, based on the weight of the granules.

11. Artificial agglomerate stone material according to claim 1, wherein the granules comprise 0.00-0.50 wt. % of $Fe_2O_3$ based on the weight of the granules.

12. Artificial agglomerate stone material according to claim 1, wherein the granules comprise crystalline silica in a range 0-7 wt. % based on the weight of the granules.

13. Artificial agglomerate stone material according to claim 1, wherein the granules comprise a crystalline phase in a range 1.0-5.0 wt. % based on the weight of the granules.

14. Artificial agglomerate stone material according to claim 1, wherein the granules comprise crystalline albite in a range 0.5-5.0 wt. % based on the weight of the granules.

15. Artificial agglomerate stone material according to claim 1, wherein the granules comprise:
- 58.00-65.00 wt % of $SiO_2$,
- 18.00-22.00 wt % of $Al_2O_3$,
- 8.50-10.50 wt % of $Na_2O$, and
- 3.50-12.80 wt % of CaO, based on the weight of the granules.

16. Artificial agglomerate stone material according to claim 1, wherein the sum of the amount of $SiO_2$, $Al_2O_3$, CaO and $Na_2O$ in the granules is 85.00-99.80 wt. % based on the weight of the granules.

17. Artificial agglomerate stone material according to claim 1, wherein the granules further comprise:
- 0.10-7.00 wt % of MgO, and/or
- 0.00-0.50 wt % of $TiO_2$, and/or
- 0.05-2.00 wt. % of $K_2O$, based on the weight of the granules.

18. Artificial agglomerate stone material according to claim 1, wherein the sum of the amount of $SiO_2$, $Al_2O_3$, CaO and $Na_2O$ in the granules is 95.00-99.50 wt. % based on the weight of the granules.

19. Process for preparing an artificial agglomerate stone material as defined in claim 1, comprising:
a) mixing a hardenable binder and inorganic fillers comprising the synthetic ceramic silicate granules as defined in claim 11, wherein the binder is an organic resin,
b) vacuum vibrocompacting the unhardened mixture obtained in a), and
c) hardening the compacted mixture obtained in b).

* * * * *